US009975359B2

(12) United States Patent
Itoh et al.

(10) Patent No.: US 9,975,359 B2
(45) Date of Patent: May 22, 2018

(54) SYSTEM FOR CONTROLLING OPERATION OF FEEDING RECORDING MEDIA, AND METHOD FOR CONTROLLING OPERATION OF FEEDING RECORDING MEDIA, AND STORAGE MEDIUM

(71) Applicants: Hiroshi Itoh, Kanagawa (JP); Manabu Kurashina, Saitama (JP)

(72) Inventors: Hiroshi Itoh, Kanagawa (JP); Manabu Kurashina, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/452,482

(22) Filed: Mar. 7, 2017

(65) Prior Publication Data
US 2017/0259590 A1 Sep. 14, 2017

(30) Foreign Application Priority Data
Mar. 14, 2016 (JP) .................................. 2016050257

(51) Int. Cl.
*B41J 13/00* (2006.01)
*B65H 3/44* (2006.01)
(Continued)

(52) U.S. Cl.
CPC ....... *B41J 13/0009* (2013.01); *B41J 13/0054* (2013.01); *B65H 3/44* (2013.01);
(Continued)

(58) Field of Classification Search
CPC .... B41J 13/00; B41J 13/0009; B41J 13/0054; B65H 3/44; B65H 7/00; B65H 7/02;
(Continued)

(56) References Cited

U.S. PATENT DOCUMENTS 7,245,870 B2 * 7/2007 Ozaki ................. B41J 11/0025
399/388
8,994,971 B2 * 3/2015 Fukuda .................... B65H 3/44
271/9.05
(Continued)

FOREIGN PATENT DOCUMENTS

JP 2007-131425 5/2007
JP 2008-181262 8/2008

*Primary Examiner* — Anh T. N. Vo
(74) *Attorney, Agent, or Firm* — Duft Bornsen & Fettig LLP

(57) ABSTRACT

A system for controlling an operation of feeding recording media from a plurality of physical medium containers of an output apparatus includes at least one memory to store output-related media/container information including logical information, property information of the recording media, and information of the plurality of physical medium containers by associating the logical information and the property information of the recording media, and associating the logical information and the information of the plurality of physical medium containers, and circuitry configured to generate an output instruction including logical information, extract the logical information from the output instruction, and identify one or more physical medium containers each containing a specific recording medium to be used in performing an image forming operation by referring the property information of the recording media and the information of the plurality of physical medium containers each associated with the extracted logical information in the memory.

10 Claims, 9 Drawing Sheets

(51) Int. Cl.
    *B65H 7/02*          (2006.01)
    *G03G 15/00*       (2006.01)
    *G06K 15/00*       (2006.01)
    *B65H 7/20*          (2006.01)

(52) U.S. Cl.
    CPC ............... *B65H 7/02* (2013.01); *B65H 7/20* (2013.01); *G03G 15/6508* (2013.01); *G03G 15/6511* (2013.01); *G06K 15/4025* (2013.01); *G06K 15/4065* (2013.01)

(58) Field of Classification Search
    CPC .. B65H 7/20; G03G 15/6508; G03G 15/6511; G06K 15/4025; G06K 15/4065
    See application file for complete search history.

(56) References Cited

U.S. PATENT DOCUMENTS

| | | | | |
|---|---|---|---|---|
| 9,471,266 B2 * | 10/2016 | Anno | ................... | G06F 3/1211 |
| 2003/0231359 A1 * | 12/2003 | Hayashi | ............. | H04N 1/00411 |
| | | | | 358/498 |
| 2006/0285900 A1 * | 12/2006 | Kurita | ................ | G03G 15/6573 |
| | | | | 399/361 |

* cited by examiner

FIG. 6

IPDS Input Tray Mapping

Map physical trays to IPDS logical input trays or map IPDS logical input trays to media catalog entries. ⟵ 150

Mode: ○ Tray Renumbering  ● Media ⟵ 151

+ ✎ 🗑 ⟵ 152

| Logical Tray | State | Media |
| --- | --- | --- |
| 1 | Enabled | A4 |
| 2 | Enabled | Blue A4 |
| 3 | Enabled | A3 |
| 4 | Enabled | A3 |
| 5 | Enabled | A4 |
| 6 | Enabled | 5 part tab stock |
| 7 | Enabled | Card Stock |
| 8 | Enabled | Yellow mailer |
| 9 | Enabled | Square paper |
| 10 | Enabled | Letter |
| 11 | Enabled | 8 × 10 |
| 12 | Disabled | Executive |

⟵ 153

Interposer Upper Logical Tray  [ 9 ⇅ ] ⟵ 154
Interposer Lower Logical Tray  [ 10 ⇅ ]

[ OK ]  [ Cancel ]

FIG. 8

| SHEET INFORMATION 1201 | LOGICAL CONTAINER NUMBER 1202 |
|---|---|
| A4 | 1 |
| A4 BLUE | 2 |
| A3 | 3 |
| A3 | 4 |
| A5 | 5 |
| ⋮ | ⋮ |
| A4 PLAIN 80g LE | 31 |
| A3 COLOR 120g SE | 32 |

FIG. 9

| LOGICAL CONTAINER NUMBER 1202 | PHYSICAL CONTAINER NUMBER 1203 |
|---|---|
| 1 | 1 |
| 2 | 1 |
| 3 | 2, 3, 4 |
| 4 | 3, 4, 2 |
| 5 | 5 |
| ⋮ | ⋮ |
| 31 | 1 |
| 32 | 6 |

SYSTEM FOR CONTROLLING OPERATION OF FEEDING RECORDING MEDIA, AND METHOD FOR CONTROLLING OPERATION OF FEEDING RECORDING MEDIA, AND STORAGE MEDIUM

CROSS-REFERENCE TO RELATED APPLICATION

This application claims priority pursuant to 35 U.S.C. § 119(a) to Japanese Patent Application No. 2016-050257, filed on Mar. 14, 2016 in the Japan Patent Office, the disclosure of which is incorporated by reference herein in its entirety.

BACKGROUND

Technical Field

This disclosure relates to a system for controlling operation of feeding recording media, a method for controlling the operation of feeding the recording media, and a storage medium storing a program for controlling the operation of feeding the recording media.

Background Art

The information output apparatus, including a medium container to store recording media such as sheets, outputs information in the form of an image formed on a recording medium supplied from the medium container. The information output apparatus is, for example, a printing apparatus. The printing apparatus may be a personal printer (hereinafter, printer) or a commercial printing machine connected to an information processing apparatus such as a personal computer (PC), in which the printing apparatus performs an image forming operation based on an output instruction received from the information processing apparatus.

The printing apparatus may include a plurality of medium containers to store various types of recording media in the respective medium containers. This printing apparatus performs the image forming operation using a recording medium supplied from one medium container that is designated in the output instruction. When a special type of recording medium is used, the entire control condition of the printing apparatus is changed in view of a type and size of the special recording medium.

The special type of recording medium means a medium having special properties such as format and size different from standard recording medium. For example, if the recording medium is paper, the special type of recording medium means paper having a size different from a standard size of paper. Further, the entire control condition of the printing apparatus includes a paper transport condition and a process condition. Therefore, when performing the image forming operation based on the output instruction designating the special type paper, the entire control condition of the printing apparatus is required to be changed to a special condition before performing the image forming operation using the special type paper.

Typically, the control condition of the printing apparatus is changed by an operator according to each type of recording medium. When various types of recording media are used, the operator work becomes complex as the operator needs to change the control condition of the printing apparatus for each type of recording medium. This may increase occurrence of an error in setting the control condition of the printing apparatus due to the complex work performed by the operator.

SUMMARY

As one aspect of the present invention, a system for controlling an operation of feeding recording media from a plurality of physical medium containers of an output apparatus is devised. The system includes at least one memory to store output-related media/container information, the output-related media/container information including logical information, property information of the recording media, and information of the plurality of physical medium containers by associating the logical information and the property information of the recording media, and associating the logical information and the information of the plurality of physical medium containers, and circuitry configured to generate an output instruction including logical information, the output instruction causing the output apparatus to perform an image forming operation, extract the logical information from the output instruction, and identify one or more physical medium containers each containing a specific recording medium to be used in performing the image forming operation by referring the property information of the recording media and the information of the plurality of physical medium containers each associated with the extracted logical information in the memory.

As another aspect of the present invention, a method of controlling an operation of feeding recording media from a plurality of physical medium containers of an output apparatus in a system is devised. The method includes storing output-related media/container information, the output-related media/container information including logical information, property information of the recording media, and information of the plurality of physical medium containers by associating the logical information and the property information of the recording media, and associating the logical information and the information of the plurality of physical medium containers, generating an output instruction including logical information, the output instruction causing the output apparatus to perform an image forming operation, extracting the logical information from the output instruction, and identifying one or more physical medium containers each containing a specific recording medium to be used in performing the image forming operation by referring the property information of the recording media and the information of the plurality of physical medium containers each associated with the extracted logical information in the memory.

As another aspect of the present invention, a non-transitory storage medium storing a program that, when executed by a computer, causes the computer to execute a method of controlling an operation of feeding recording media from a plurality of physical medium containers of an output apparatus in a system is devised. The method includes storing output-related media/container information, the output-related media/container information including logical information, property information of the recording media, and information of the plurality of physical medium containers by associating the logical information and the property information of the recording media, and associating the logical information and the information of the plurality of physical medium containers, generating an output instruction including logical information, the output instruction causing the output apparatus to perform an image forming operation, extracting the logical information from the output instruction, and identifying one or more physical medium containers each containing a specific recording medium to be used in performing the image forming operation by referring the property information of the recording media and the information of the plurality of physical medium containers each associated with the extracted logical information in the memory.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 6 is one example of a setting edition screen of the embodiment;

FIG. 8 is an example of a logical container information list associating logical container numbers and recording media;

FIG. 9 is an example of a physical container information list associating logical container numbers and physical container numbers.

Figure 1:
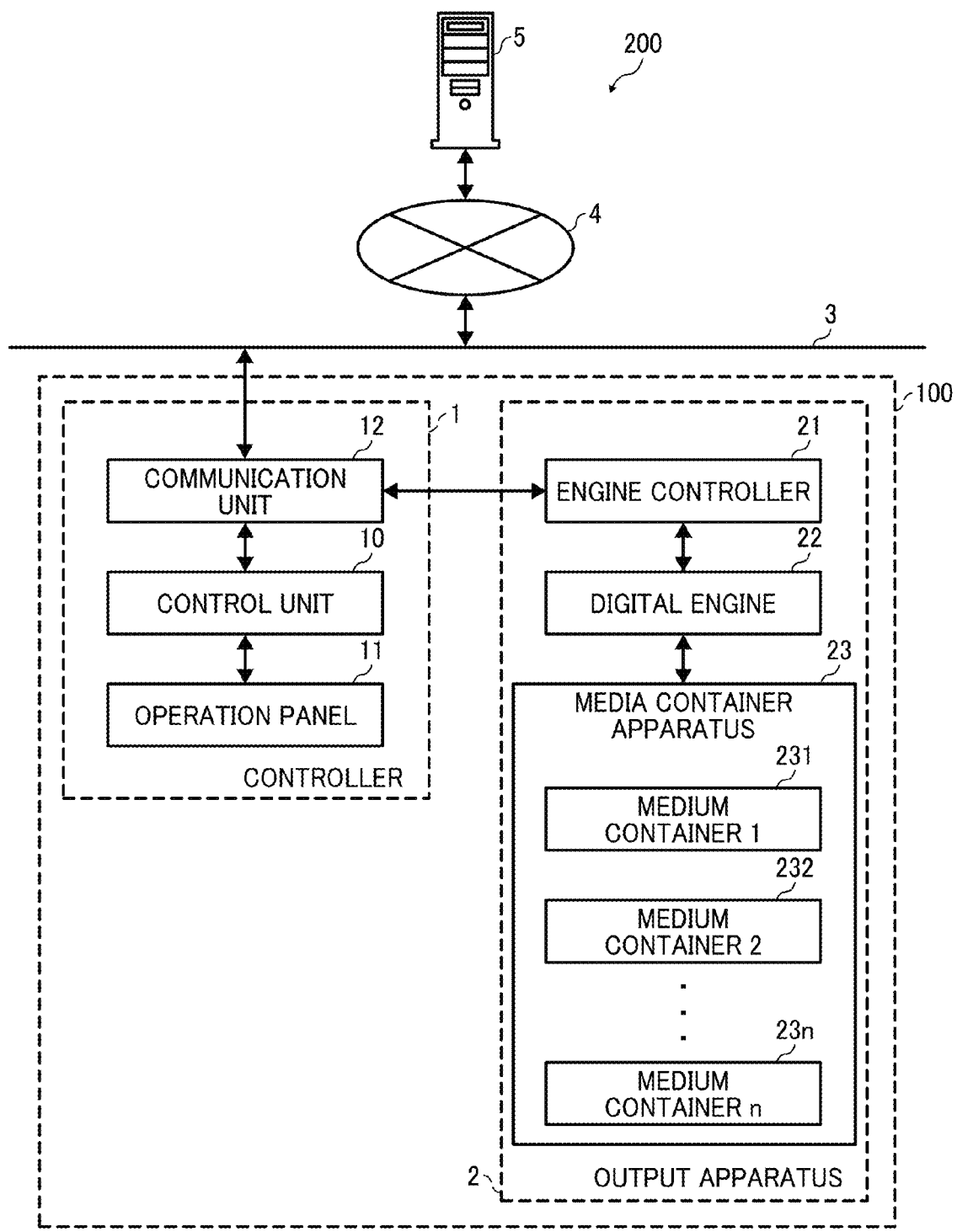
FIG. 1 is a block diagram of a configuration of a printing control system including an apparatus for controlling an operation of feeding recording media of an embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise.

Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present description is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

(Apparatus for Controlling Operation of Feeding Recording Media)

A description is given of an example of a system for controlling an operation of feeding recording media of an embodiment of the present invention with reference to drawings. FIG. 1 is a block diagram of a configuration of a printing control system 200 used as the system for controlling the operation feeding recording media of the embodiment of the present invention. The printing control system 200 includes, for example, a printing apparatus 100, and a HOST 5 communicably coupled to or connected with each other via a network. The printing apparatus 100 includes, for example, a controller 1 and an output apparatus 2. In an example case of FIG. 1, the controller 1 can be used an apparatus or unit to control the operation feeding the recording media. The printing apparatus 100 can be used as an information output apparatus such as an image forming apparatus, and the HOST 5 can be used as an output instruction generation apparatus.

As indicated in FIG. 1, the printing apparatus 100 is communicably coupled to or connected with the HOST 5 via a communication network 4. The HOST 5 is an information processing apparatus that may be used for commercial business such as a large scale computer. In this disclosure, the HOST 5, used as the output instruction generation apparatus, generates an output instruction. The output instruction generated by the HOST 5 and transmitted to the printing apparatus 100 via the communication network 4 uses, for example, data stream for a higher performance printing apparatus such as Intelligent Print Data Stream (IPDS). The IPDS is used as an interface for an all points addressable printer. By applying the IPDS, pages having various types of data can be printed correctly.

The communication network 4 is, for example, the Internet. The HOST 5 can be disposed at one site, and the printing apparatus 100 can be disposed at another site, which are remote sites distanced with each other.

The printing apparatus 100 includes, for example, the controller 1, and the output apparatus 2. The printing apparatus 100 is used as an example of the image forming apparatus in this disclosure. The controller 1 and the output apparatus 2 can be communicably coupled to or connected with each other by using a direct line without using a local area network (LAN) 3. Further, if a good level of security and data transmission band can be secured between the controller 1 and the output apparatus 2, the controller 1 and the output apparatus 2 can be communicably coupled to or connected with each other via the LAN 3. The LAN 3 and the communication network 4 are coupled or connected with each other, with which the LAN 3 is coupled to the HOST 5 via the communication network 4. With this configuration, the HOST 5 and the printing apparatus 100 can be communicably coupled or connected with each other via the communication network 4 and the LAN 3. In this configuration, the output instruction generated by the HOST 5 and transmitted to the printing apparatus 100 can be processed by the controller 1, and the output instruction can be used as a source instruction to perform a given image forming operation at the output apparatus 2.

In this description, it is assumed that the HOST 5 and the printing apparatus 100 are disposed at different sites, which are remote sites with each other while the controller 1 and the output apparatus 2 of the printing apparatus 100 are disposed at relatively near places such as the same building or the same room.

As indicted in FIG. 1, the controller 1 includes, for example, a control unit 10, an operation panel 11, and a communication unit 12. The communication unit 12 can be used to receive the output instruction transmitted from the HOST 5 such as an external apparatus, and to transfer the received output instruction to the control unit 10 to be described later. Further, the communication unit 12 is used to communicate information with the output apparatus 2.

The controller 1 is, for example, a digital front end (DFE). The DFE performs the image processing required for a printing operation at the output apparatus 2. Therefore, the DFE includes a raster image processor (RIP) engine that can generate raster data, which is image data to be used at the output apparatus 2 when performing the printing operation.

The control unit 10 controls the controller 1 entirely. The control unit 10 analyzes the output instruction received from the communication unit 12, in which the control unit 10 determines information designating a recording medium (e.g., sheet) used for the image forming operation, and information indicating a medium container where the designated recording medium is stored. The control unit 10 will be described in detail later.

The operation panel 11 is an information input device such as a touch screen. The operation panel 11 is used as the information input device to input, for example, condition settings to be used for an analysis process of the control unit 10.

The output apparatus 2 includes, for example, an engine controller 21, a digital engine 22, and a container (tray) unit 23. The output apparatus 2 is, for example, a digital printing apparatus using an electrophotography method, an inkjet method or the like that performs an image forming operation without using a plate. The engine controller 21 controls physical factors such as fixing temperature of toner to be used for the image forming operation using the sheet. The digital engine 22 performs processing of the image data received from the controller 1 based on the physical factors controlled by the engine controller 21 to be used for the image forming operation. The digital engine 22 may include an image generator and a printing unit to perform the image forming operation.

As indicated in FIG. 1, the media container apparatus 23 can be configured with a plurality of medium containers to contain a plurality of recording media such as sheet (e.g., paper). Specifically, the media container apparatus 23 includes a first container 231 (hereinafter, medium container 231), a second container 232 (hereinafter, medium container 232), and a n-th container 23n (hereinafter, medium container 23n), in which "n" is a natural number. When a plurality of types of recording media is used, each of the medium containers of the media container apparatus 23 may contain a specific type recording medium (hereinafter, specific recording medium). As to the media container apparatus 23, each one of the medium containers 231, 232, and 23n contain one type of the recording medium among various types of recording media having different properties. Based on the instruction information received from the controller 1, the media container apparatus 23 selects a specific recording medium corresponding to the instruction information from a specific medium container containing the corresponding specific recording medium, and supplies the selected specific recording medium for performing the image forming operation.

In a case of FIG. 1, the output apparatus 2 is the digital printing apparatus, but not limited thereto. For example, the output apparatus 2 can be an offset printing apparatus that performs an image forming operation using a plate. In a case of FIG. 1, the controller 1 and the output apparatus 2 are disposed in the same apparatus such as the printing apparatus 100, but not limited thereto. For example, the controller 1 and the output apparatus 2 can be devised as different independent apparatuses.

(Hardware Block Diagram)

Figure 2:
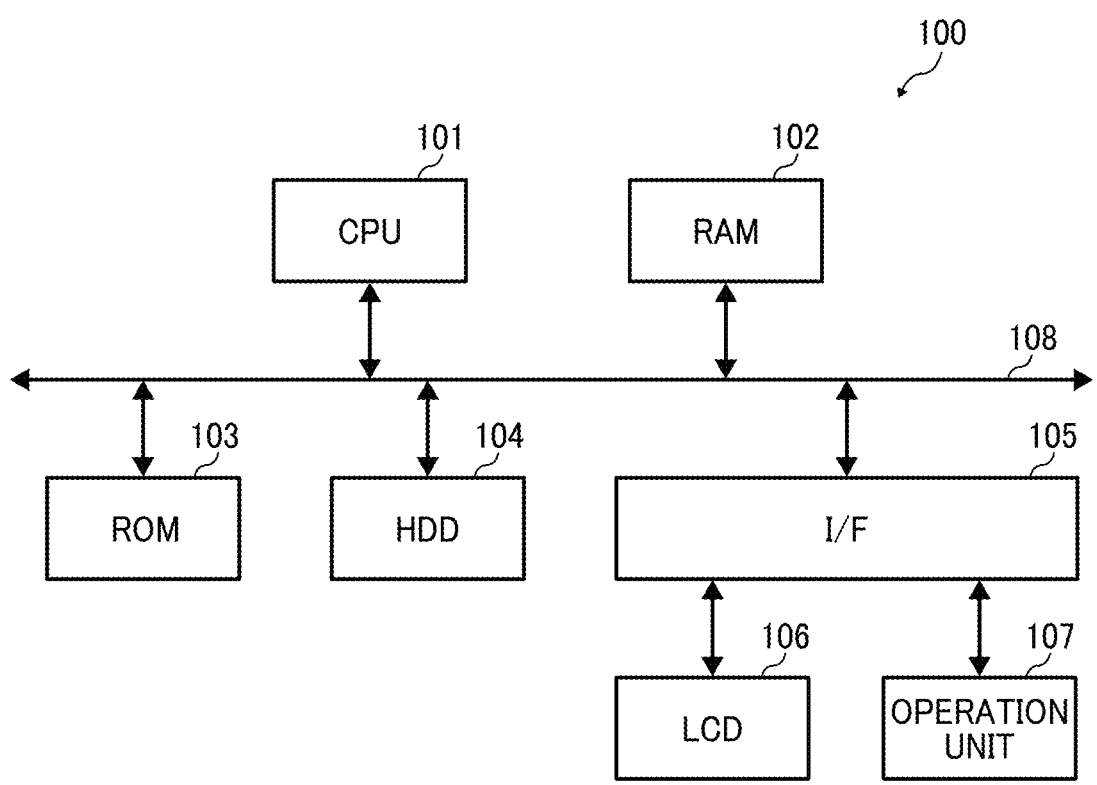
FIG. 2 is a block diagram of a hardware block diagram of an information processing apparatus included in the apparatus for controlling the operation of feeding the recording media of an embodiment.

A description is given of a hardware block diagram of the information processing apparatus such as the HOST 5 and the controller 1 with reference to FIG. 2. As indicated in FIG. 2, the information processing apparatus in this disclosure has a configuration similar to general servers and personal computers (PC). Specifically, the information processing apparatus such as the HOST 5 and the controller 1 includes, for example, a central processing unit (CPU) 101, a random access memory (RAM) 102, a read only memory (ROM) 103, a hard disk drive (HDD) 104, and an interface (I/F) 105 that can be connected or coupled with each other by a bus 108. Further, a liquid crystal display (LCD) 106 and an operation unit 107 can be connected or coupled to the interface I/F 105.

The CPU 10 is a computing unit such as circuitry or a processor that controls the entire operations of the information processing apparatus. The RAM 20 is a volatile memory, to which information can be read and written with a high speed, and the CPU 10 uses the RAM 20 as a working area when processing information or data. The ROM 30 is a non-volatile memory used as a read only memory, in which various programs such as firmware are stored. The HDD 40 is a non-volatile memory, to which information can be read and written. For example, the HDD 40 stores an operating system (OS), various control programs, and application programs.

The I/F 105 is connected or coupled to the bus 108, various units and networks, and controls the connection or coupling. The LCD 106 is a user interface, with which a user can check a status of the information processing apparatus visually. The LCD 106 can be used as a display. The operation unit 107 is a user interface such as a key board and a mouse, with which a user can input information to the information processing apparatus. Since the HOST 5 is used as a server, a user interface such as LCD 106 and operation unit 107 can be omitted for the HOST 5.

As to the above described hardware block diagram of the information processing apparatus, the CPU 101 performs computing by loading programs stored in the ROM 103, the HDD 104, and/or an external memory such as an optical disk on the RAM 102 to configure a software module. With a combination of the software module and the hardware, the functional blocks required for the controller 1 used as the apparatus for controlling the operation feeding the recording media can be devised.

(Software Configuration)

Figure 3:
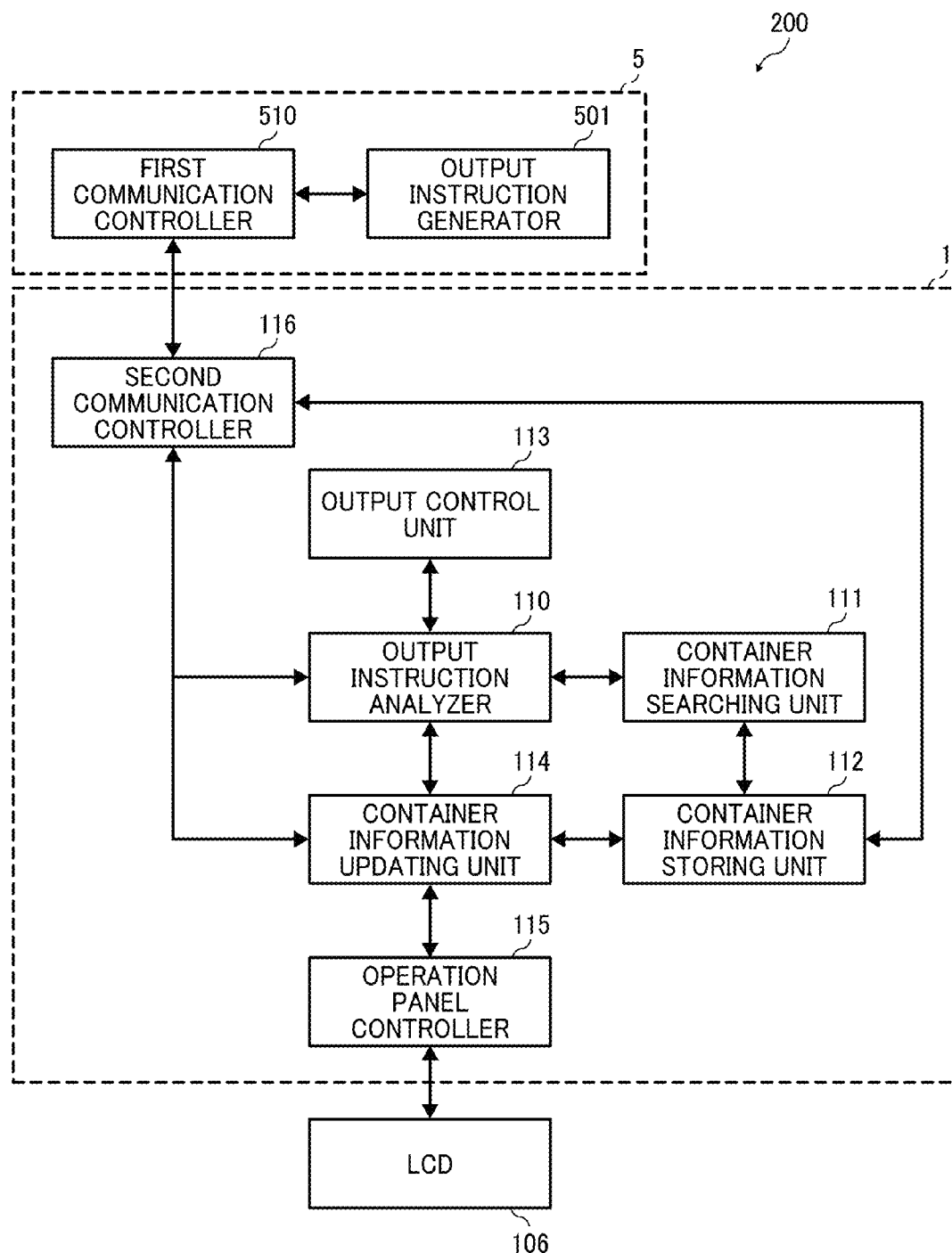
FIG. 3 is software modules executable in the printing control system of the embodiment.

A description is given of software modules executable in the printing control system 200 with reference to FIG. 3. As indicated in FIG. 3, the HOST 5 includes, for example, a first communication controller 510, and an output instruction generator 501 as software modules. As indicated in FIG. 3, the controller 1 used as the apparatus for controlling the operation feeding the recording media includes, for example, an output instruction analyzer 110, a container information searching unit 111, a container information storing unit 112, an output control unit 113, a container information updating unit 114, an operation panel controller 115, and a second communication controller 116 as software modules.

The first communication controller 510 of the HOST 5 performs a communication processing (communication step) such as receiving information (e.g., output-related media/container information) reported from the controller 1, and transmitting an output instruction to the controller 1.

The output instruction generator 501 is also used as a logical information storing unit that stores the output-related media/container information reported from the controller 1. Therefore, the output instruction generator 501 stores the output-related media/container information reported from the controller 1 in a memory such as the RAM 102. FIG. 8 illustrates an example of the output-related media/container information indicated as a logical container information list 120. As indicated in FIG. 8, the logical container information list 120, used as the output-related media/container information, includes a sheet information 1201 and a logical container number 1202 by associating the sheet information 1201 and the logical container number 1202.

The sheet information 1201 is property information indicating a "sheet type" that specifies or identifies the type of recording medium. As disclosed later in this description, since the logical container number 1202 is associated with a physical container number 1203 associated with one or more medium containers (see FIG. 9) actually disposed for the printing apparatus 100, the logical container number 1202 can be used as the identifier to identify each one of the plurality of the medium containers actually disposed for the printing apparatus 100. The logical container number 1202 may be also referred to as the logical information in this description.

The logical container information list 120 includes the logical container number 1202, which is one information required to identify or specify a recording medium designated in an output instruction. FIG. 8 illustrates an example of the type of recording medium identified or specified by the logical container number 1202, but the type of recording medium identified by the logical container number 1202 is not limited thereto. For example, information indicating an output direction of recording medium can be included in the type of recording medium. The information indicating the output direction of recording medium means, for example, "long edge feed (LEF)" and "short edge feed (SEF)." The "LEF" means a sheet is fed along a long side of the sheet, and the "SEF" means a sheet is fed along a short side of the sheet.

The logical container information list 120 is stored in the container information storing unit 112 to be described later. The logical container information list 120 is reported to the HOST 5 from the controller 1 in the above described transmission process.

The output instruction generator 501 generates an output instruction to be reported to the controller 1 (output instruction generation step). When generating the output instruction at the output instruction generator 501, the output instruction generator 501 refers information included in the output-related media/container information, which is already reported from the controller 1. Therefore, the output instruction generator 501 generates the output instruction including the output-related media/container information and output target information (output instruction generation step).

The output target information means, for example, information such as images and characters to be output by using the recording medium identified or specified by the output-related media/container information.

As to the controller 1, the second communication controller 116 transmits the output-related media/container information to the HOST 5, and receives output-related information from the HOST 5.

The output instruction analyzer 110 analyzes the output instruction received from the HOST 5 via the second communication controller 116 (output instruction analysis step). The output instruction analyzer 110 analyzes the output instruction to extract the "output-related media/container information" and the "output target information" included in the output instruction.

The container information searching unit 111, used as a container searching unit, extracts information related to a physical position of a specific medium container from the container information storing unit 112 based on the output-related media/container information (container searching step). The container information searching unit 111 searches information stored in the container information storing unit 112 based on the output-related media/container information.

Further, the container information searching unit 111 searches the container information storing unit 112 to identify or specify identification information of the medium container, stored in the container information storing unit 112 by associating the identification information of the medium container with the output-related media/container information, wherein the output-related media/container information is used as a search key. The identification information of the medium container means, for example, a logical management number assigned to each one of the medium containers.

The container information storing unit 112 reads out management information that can identify or specify a physical position of the medium container from the logical management information of the medium container associated with the output-related media/container information included in the output instruction received from the HOST 5. Further, the container information storing unit 112 stores information, updated by an operation of the operation panel 11, to the HDD 104 used as an information storage medium (storing step).

A description is given of an example of a physical container information list 121 stored in the container information storing unit 112 with reference to FIG. 9. Information of the medium containers can be configured with the logical container information list 120 and the physical container information list 121 stored in the container information storing unit 112. The physical container information list 121 indicates the medium containers where the recording media are contained actually. As indicated in FIG. 9, the physical container information list 121 includes the logical container number 1202 and a physical container number 1203, which are associated with each other. For example, one number of the logical container number 1202 is associated with one or more numbers of the physical container numbers 1203 as indicated in FIG. 9, which means one logical container number is associated with one or more physical container numbers.

In this description, the logical container means a virtual container associated with properties of one recording medium such as size and direction of one recording medium. When the logical container number 1202 is identified or specified, property information of recording medium such as color, size, thickness, basis weight, direction, and type can be identified or specified. The physical container means a container that contains one of recording media (e.g. sheet) actually. As indicated in FIG. 9, the logical container number 1202 can be associated with one or more numbers of the physical container numbers 1203 (i.e., actual containers). Therefore, the logical container number 1202 can be used as an identifier to identify each one of the plurality of the medium containers (i.e., medium containers 231,232, 23n in FIG. 1) included in the media container apparatus 23. Therefore, the recording medium identified or specified by the logical container number 1202 can be set in one or more containers among the plurality of containers actually disposed for the printing apparatus 100.

In this description, the logical container information list 120 indicated in FIG. 8 is stored in the output instruction generator 501, and the physical container information list 121 is stored in the container information storing unit 112, which means the logical container information list 120 and the physical container information list 121 are stored in different units such as different memories, but the logical container information list 120 and the physical container information list 121 can be stored in the same units such as the same memory.

As indicated in FIG. 9, the logical container number 1202 included in the output instruction is associated with the physical container number 1203. Therefore, when the physical container number 1203 is identified or specified, the recording medium can be supplied or fed from one of the actual medium containers. With this configuration, the output target information can be output by using a given recording medium.

The output control unit 113 reports the output target information and the output-related media/container information to the output apparatus 2 based on the analysis result of the output instruction analyzer 110 to be used for an operation at the output apparatus 2.

The container information updating unit 114 can change the logical container information list 120 stored in the container information storing unit 112 based on an input from the operation panel controller 115, and then stores the changed logical container information list 120 in the container information storing unit 112 (updating step).

The operation panel controller 115 displays a setting edition screen on the LCD 106 by using a hardware resources such as the LCD 106 and the operation unit 107 (see FIG. 2) to perform adding, editing, or deleting of information of the logical container information list 120 on the LCD 106. Further, the operation panel controller 115 changes a display status based on a change operation, and updates contents of the logical container information list 120 based on the changed display status.

Figure 7:
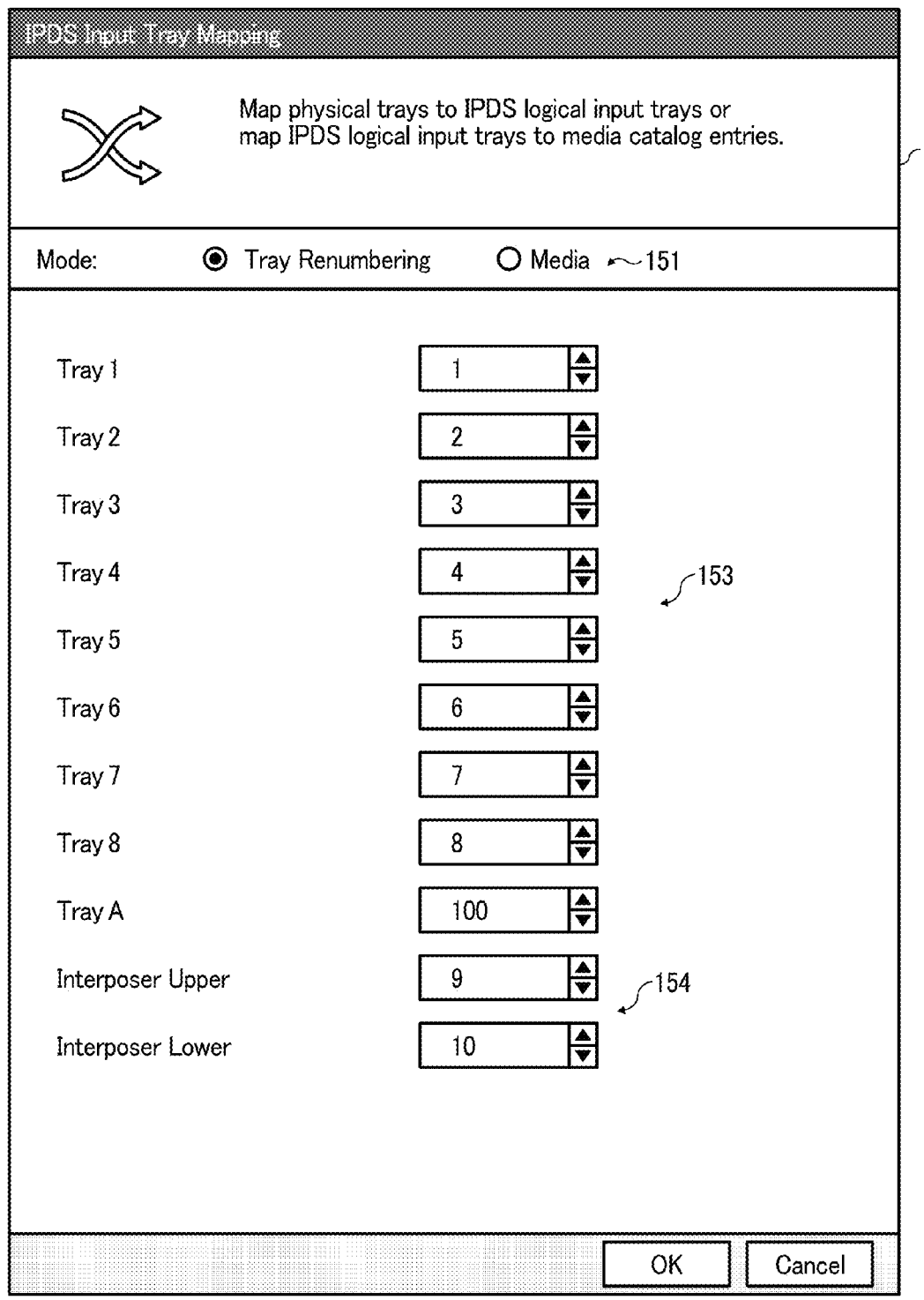
FIG. 7 is another example of a setting edition screen of the embodiment.

FIGS. 6 and 7 are examples of a screen 150 used as the setting edition screen. FIGS. 6 and 7 illustrates the screen 150 including, for example, a mode selector 151, an operation selector 152, a tray setting 153, and an interposer setting 154. In FIGS. 6 and 7, the container is indicated as the tray.

The mode selector 151 includes, for example, radio buttons used for selecting a plurality of modes settable to the apparatus. The operation selector 152 includes, for example, a plurality of icons used for selecting a plurality of operations set to the apparatus via the screen 150. The tray setting 153 displays the logical container information list 120 set to the apparatus. The interposer setting 154 indicates an identifier of a medium container that stores a medium not used for the printing. The medium not used for the printing means, for example, a sheet to be inserted between printed sheets when a given number of sheets are printed.

For example, the mode selector 151 can be used to select two modes such as a tray renumbering mode and a media mode. FIG. 6 is an example the setting edition screen when the media mode is selected. FIG. 7 is an example the setting edition screen when the tray renumbering mode is selected.

As indicated in FIG. 6, when the media mode is selected, the screen 150 displays the operation selector 152 and the interposer setting 154. By contrast, as indicated in FIG. 7, when the tray renumbering mode is selected, the screen 150 does not display the operation selector 152. As to the screen 150 of FIG. 6, the operation selector 152 displays icons used for selecting a process. For example, the operation selector 152 displays an icon used for editing and an icon used for deleting information that is set already, and an icon used for adding new information. When one icon is clicked, the corresponding process is performed.

The tray setting 153 displays information stored in the container information storing unit 112 (see FIG. 3) for both of the media mode and the tray renumbering mode. However, the tray setting 153 used for the media mode and the tray setting 153 used for the tray renumbering mode are used to set different contents. For example, as indicated in FIG. 6, when the media mode is selected, the "logical container number" "state" and "media (i.e., sheet type)" included in the information are associated with each other. The media (i.e., sheet type) included in the tray setting 153 in FIG. 6 can be set with information indicating a physical property and a print product property of a recording medium. For example, the physical property means size, color, basis weight, and type of the sheet while the print product property means a type of target print product such as an envelope. In an example case of FIG. 6, the physical property includes, for example, the size of "A4, A3," the type of "tab stock," and the print product property includes, for example, "mailer."

Different from the physical container number linked to the actual medium container disposed for the printing apparatus 100, the logical tray number indicated in FIG. 6 can be used as identification information to identify the setting information. The "state" indicates whether each one of the settings can be used (i.e., enabled) or cannot be used (i.e., disabled). The logical container or tray is used as a virtual container or tray that can be linked to one or more actual medium containers or trays disposed for the printing apparatus 100. For example, if one logical container set with conditions of a specific recording medium such as type, size, and feed orientation, the one logical container can be linked to one or more actual medium containers that match the conditions of the specific recording medium such as type, size, and feed orientation set for the one logical container.

The combination patterns of the sheet information 1201 and the logical container number 1202 included in the logical container information list 120 can be changed. For example, the combination patterns can be increased by using the operation selector 152 of FIG. 6. Specifically, the number of types of recording media that can be set by using the media mode is logical numbers, which are different from actual numbers of the medium containers disposed for the printing apparatus 100. Therefore, when the media mode is selected, the number of information of recording media settable to the system can be any numbers as required without the limitation of the actual numbers of the medium containers disposed for the printing apparatus 100.

Further, the physical container number 1203 can be directly designated by using the screen 150 of FIG. 7 when the output instruction is transmitted. Specifically, one physical container number associated with one sheet type designated in the output instruction can be designated by touching the screen 150 when a user touches the screen 150. The user may use this function when the user wants to perform the image forming operation when the image forming operation is not performed even when the output instruction is transmitted by setting one logical container number in the output instruction.

As to the embodiment, the operation feeding the recording media can be performed effectively when the output-related media/container information is set by using the screen 150 of FIG. 6.

Figure 4:
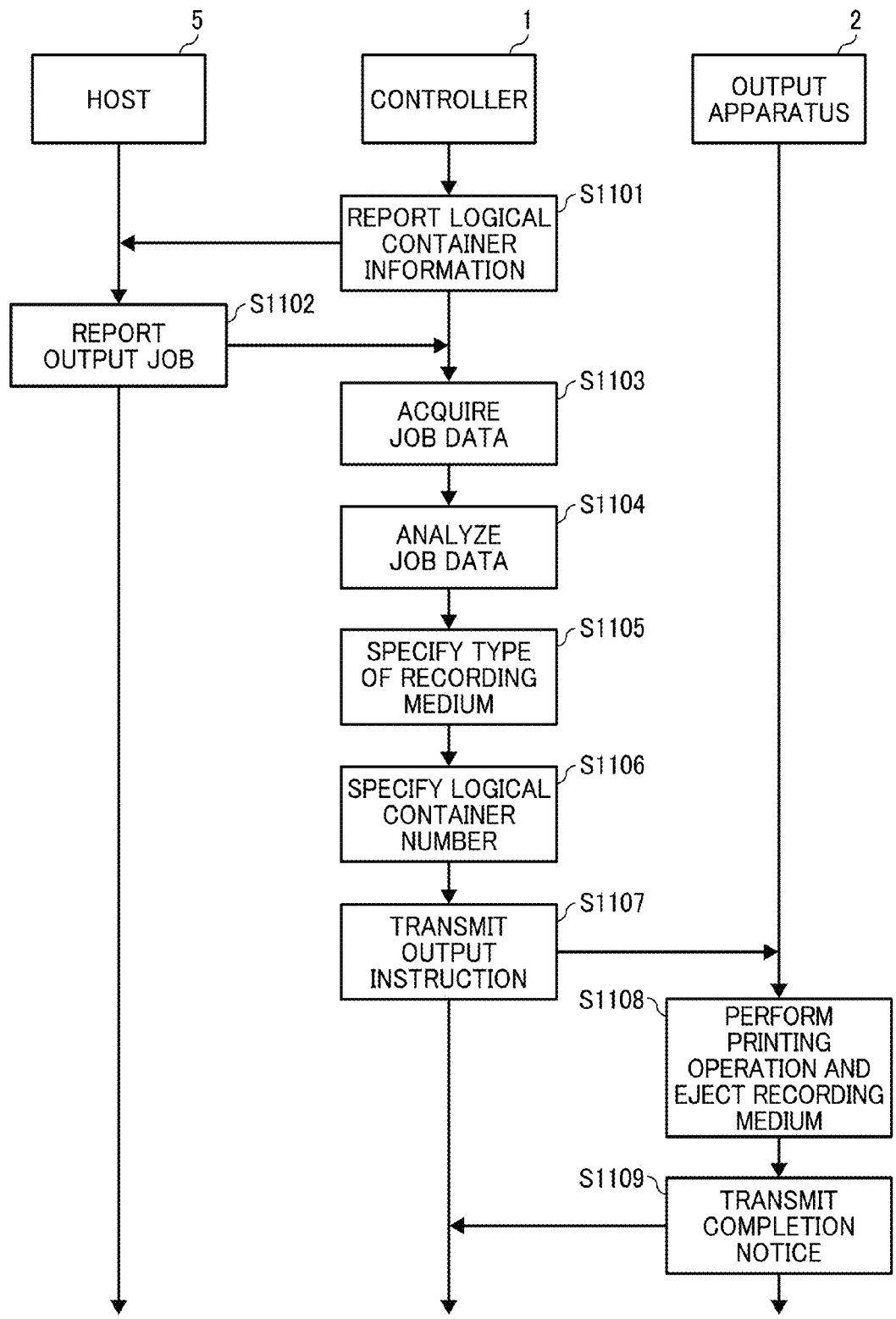
FIG. 4 is a sequential chart of an example operation of a controller of the embodiment.

First Embodiment of Method of Controlling Operation of Feeding Recording Media A description is given of an example of operation of the controller 1 with reference to FIG. 4. At first, the controller 1 reports the logical container information list 120 stored in the container information storing unit 112 to the HOST 5 (S1101), in which the logical container information list 120 reported to the HOST 5 includes information indicating which type of recording medium can be used (i.e., enable) for performing as printing operation.

Then, the HOST 5 reports an output instruction instructing the contents of the printing operation to the controller 1 as an "output job" (S1102), and then the controller 1 acquires job data of the output job reported from the HOST 5 (S1103).

Then, the output instruction analyzer 110 analyzes the job data of the acquired output job (S1104). Then, the controller 1 identifies or specifies a type of the recording medium used as an output-use medium based on an analysis result of the output instruction (S1105), and identifies or specifies the logical container number 1202 associated with the identified or specified recording medium (S1106).

Then, the output instruction analyzer 110 identifies or specifies the physical container number 1203 from the logical container number 1202 identified or specified at step S1106, and generates instruction information instructing a feed operation of a recording medium from the medium container associated with the physical container number 1203 identified or specified from the logical container number 1202 identified or specified at step S1106, and transmits the output target information and the instruction information of to-be-used recording medium to the output apparatus 2 (S1107).

Based on the output target information and the instruction information transmitted from the controller 1, the output apparatus 2 performs a printing operation to the recording medium and ejects the printed recording medium (S1108). Then, the output apparatus 2 transmits a completion notice to the controller 1 when the image forming operation is completed (S1109).

Figure 5:
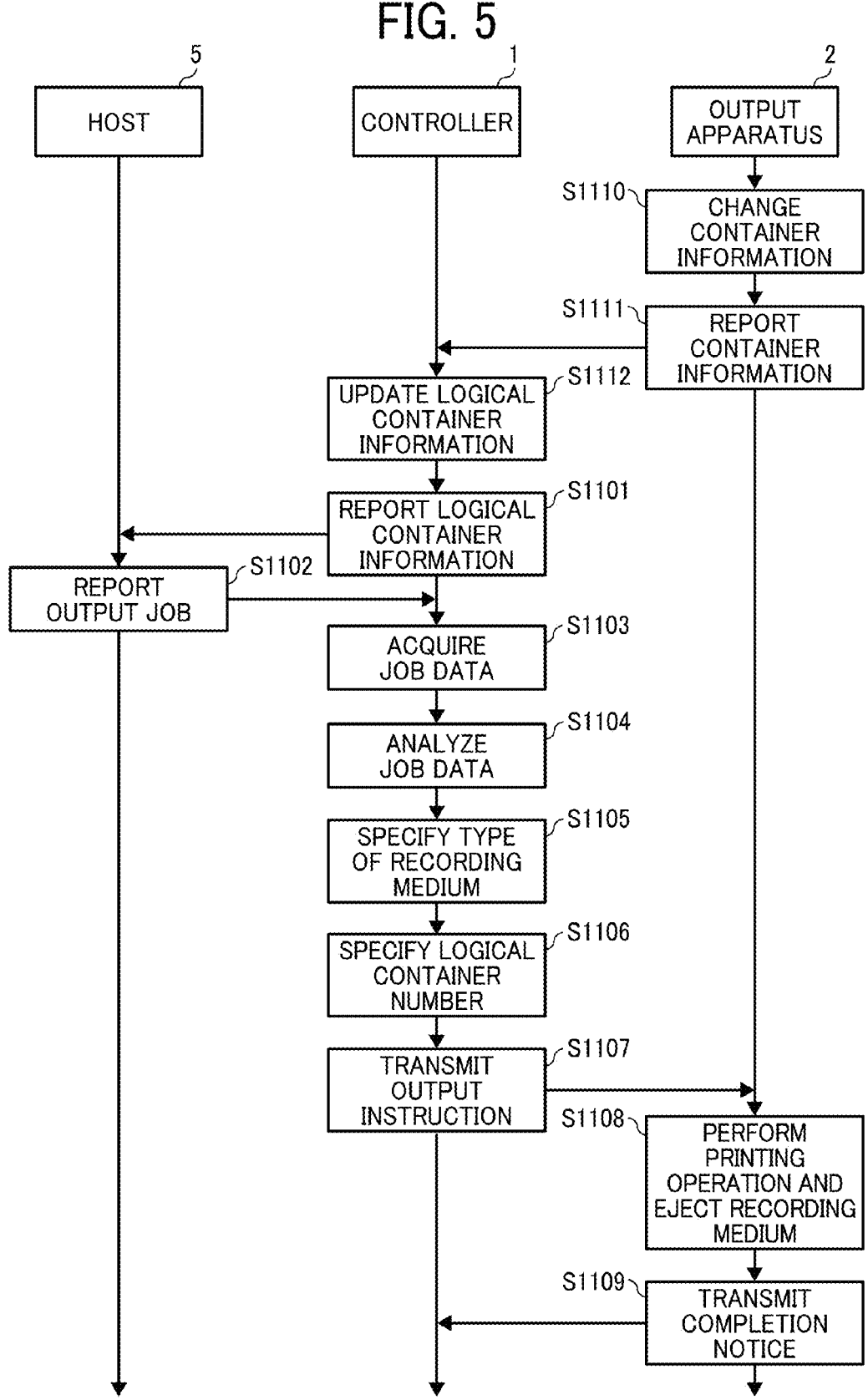
FIG. 5 is a sequential chart of another example operation of a controller of the embodiment.

Second Embodiment of Method of Controlling Operation of Feeding Recording Media A description is given of another example of operation of the controller 1 with reference to FIG. 5, which is a sequential chart of another example operation of the controller 1. As above described, information stored in the container information storing unit 112 can be updated by using the screen 150. Further, when the recording medium stored in the medium container of the output apparatus 2 is changed, the output apparatus 2 can report the medium change information to the controller 1.

When the recording medium stored in a specific medium container in the output apparatus 2 is changed, the output apparatus 2 detects the change of the recording medium in the specific medium container, and changes the container information (S1110). Then, the output apparatus 2 reports the changed container information to the controller 1 (S1111).

Based on the changed container information reported from the output apparatus 2, the controller 1 updates the logical container information list 120 stored in the container information storing unit 112 (S1112). After updating the logical container information list 120, the controller 1 reports the container information to the HOST 5 (S1101).

As to the above described controller 1, based on the information changed at the output apparatus 2, the controller 1 automatically updates information associating the medium container and the recording medium, and reports the updated information to the HOST 5. With this configuration, the HOST 5 can generate the output instruction matched to a current status of the output apparatus 2.

As to the above described controller 1, the controller 1 executes the program for controlling the operation feeding the recording media to control the operation feeding the recording media indicated in FIGS. 4 and 5

(Program for Controlling Operation of Feeding Recording Media)

Figure 10:
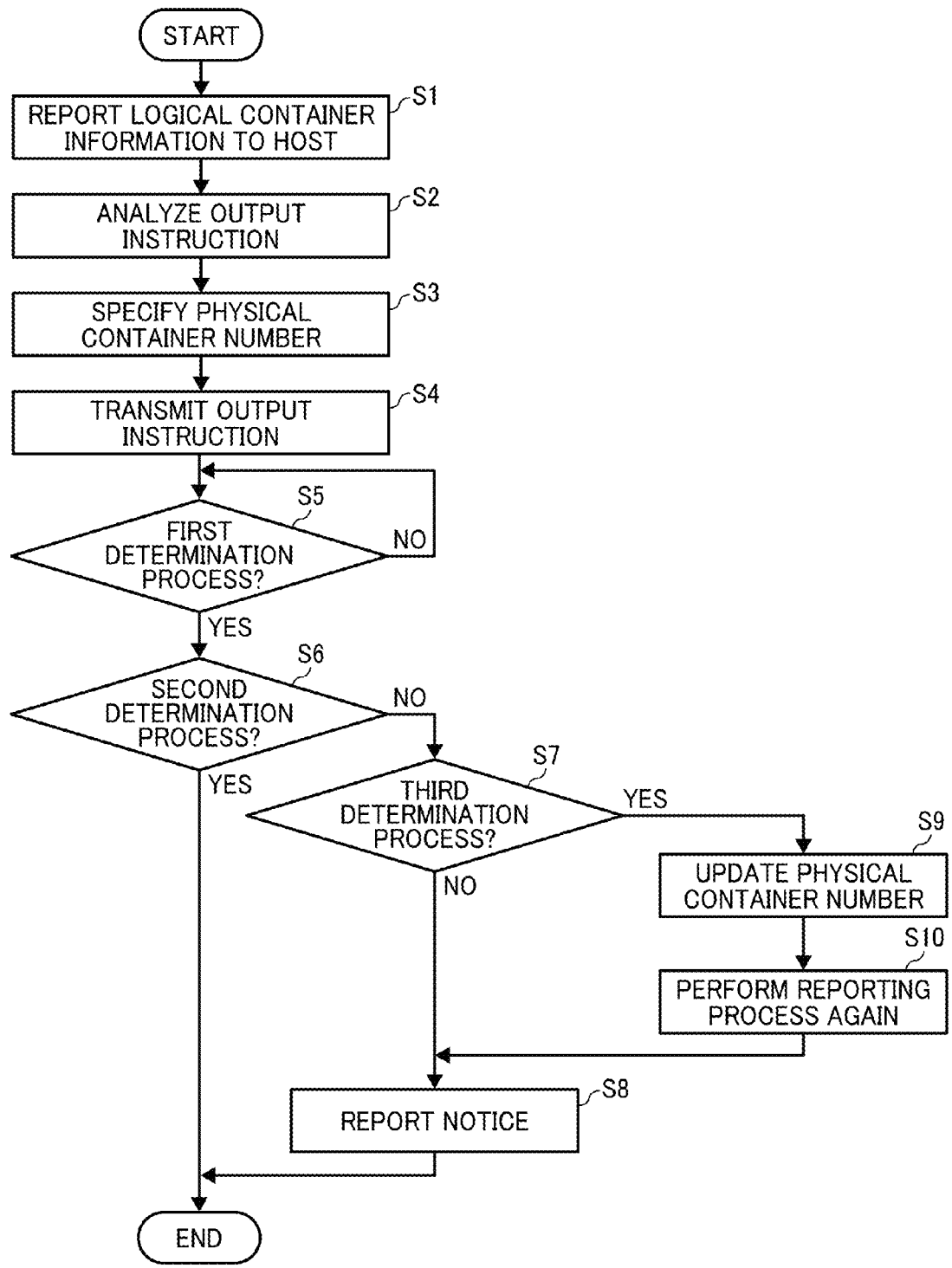
FIG. 10 is a flowchart illustrating steps of a process of controlling the operation of feeding the recording media of the embodiment.

A description is given of a program for controlling the operation feeding the recording media of an embodiment with reference to FIG. 10, which is a flowchart illustrating steps of a process of controlling the operation feeding the recording media of the embodiment.

At first, the controller 1 reports the logical container information list 120 to the HOST 5 (container information reporting process) (S1). The reported logical container information list 120 (see FIG. 8) includes a plurality of combination patterns of the sheet information 1201 indicating physical property of the recording medium, and the logical container number 1202. Each of the logical container numbers is used to store property information of recording medium logically, which means as data.

Then, the controller 1 receives the output instruction from the HOST 5, and analyzes the output instruction (S2). By analyzing the output instruction, the output-related media/container information, corresponding to the sheet information 1201, included in the output instruction can be identified or specified.

Then, the container information storing unit 112 performs the searching process using the output-related media/container information, performs the identification process of the medium container (S3) to identify or specify the physical container number 1203, with which an actual medium container that contains a specific recording medium used for outputting the output target information can be identified or specified.

Then, the controller 1 transmits the output instruction to the output apparatus 2. Specifically, the controller 1 reports the output target information and the identified physical container number to the output apparatus 2 (S4).

Then, the output apparatus 2 performs the outputting process such as the image forming operation. When the image forming operation is completed, the output apparatus 2 is configured to transmit a completion notice to the controller 1, which means the controller 1 performs a first determination process to determine whether the controller 1 receives any report from the output apparatus 2 (S5). If the controller 1 does not receive the report from the output apparatus 2 (S5: NO), the first determination process is performed again. If the controller 1 receives the report from the output apparatus 2 (S5: YES), the sequence proceeds to a next step.

Then, the controller 1 performs a second determination process to determine whether the controller 1 receives the completion notice from the output apparatus 2 (S6). If the controller 1 receives the completion notice from the output apparatus 2 (S6: YES), the sequence is completed. By contrast, if the controller 1 does not receive the completion notice but receives another notice from the output apparatus 2 (S6: NO), the controller 1 performs a third determination process to determine whether the controller 1 receives a notice indicating an error of recording medium from the output apparatus 2 (S7). The error of recording medium means, for example, that the recording medium cannot be fed from the medium container indicated by the physical container number 1203 that is instructed to the output apparatus 2 at S4 (output instruction process). For example, the error of recording medium means the recording medium is not stored in the medium container (i.e., empty), which is known as the out of sheet condition.

If the controller 1 does not receive the notice indicating error of recording medium from the output apparatus 2 but receives another notice from the output apparatus 2 (S7: NO), the controller 1 reports another notice having another contents to an operator such as a maintenance person (S8), and the sequence is completed.

If the controller 1 receives the notice indicating the error of recording medium from the output apparatus 2 (S7: YES), the controller 1 uses the container information storing unit 112 to perform the searching process of the physical container information list 121 (S9). If step S7 is YES, one actual medium container indicated by one physical container number, identified from the output instruction does not contain the recording medium. Therefore, the container information storing unit 112 searches the physical container information list 121 to determine another actual medium container, indicated by another physical container number associated with the logical container number 1202 extracted from the output instruction (e.g., logical container number 3 is associated with physical container numbers 2, 3, 4 in FIG. 9) (S9). When another actual medium container indicated by another physical container number is determined (S9), the controller 1 updates the physical container number 1203 associated with the logical container number 1202, which means the controller 1 updates one physical container number that was reported to the output apparatus 2 for the previous reporting process to another physical container number (S9).

Then, based on the updated physical container number 1203 (i.e., another physical container number), the controller 1 performs the reporting process again to the output apparatus 2 (S10), and the controller 1 reports the output instruction to the output apparatus 2 again.

With this configuration, even if the sheet empty occurs in one medium container, if other medium container stores the target recording medium that can be used for the output instruction, the controller 1 reports the HOST 5 to output the output target information by using the target recording medium currently contained in other medium container, and the controller 1 changes a to-be-used medium container at the output apparatus 2 so that the outputting process such as the image forming operation can be performed without interruption.

As indicated in FIG. 9, a plurality of physical container numbers 1203 can be pre-set for each one of the logical container numbers 1202, in which the plurality of physical container numbers 1203 can be associated with each one of the logical container numbers 1202 by pre-setting priorities among the plurality of physical container numbers 1203. Therefore, even if the sheet empty occurs for one number of the plurality of physical container numbers 1203, the next number of the plurality of physical container numbers 1203 can be set as a currently-useable physical container number, and the updating process of the medium container is performed (S9) based on the priorities.

Then, the changing or switching of the physical container number 1203 is reported to an operator (S8), and the sequence is completed.

As above described, when the output instruction is generated in the HOST 5, the controller 1 designates the type of recording medium to be used alone. Therefore, by indicating the to-be-used recording medium in the output instruction, even if the position (number) of the medium container storing the to-be-used recording medium is changed during the processing is performed in the system, the output instruction is not required to be generated again to perform the image forming operation.

Further, when the position (number) of the medium container containing the to-be-used recording medium at the output apparatus 2 is changed, the controller 1 can automatically change the position (number) of the medium container. Therefore, the processing using suitable recording medium can be performed without performing the complex work that changes the setting at the information output apparatus and/or the output instruction generation apparatus.

As to the above described embodiment, a work load of an operator at the information output apparatus and a work load of an operator at the output instruction generation apparatus can be reduced.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present disclosure may be practiced otherwise than as specifically described herein. For example, elements and/or features of different examples and illustrative embodiments may be combined each other and/or substituted for each other within the scope of this disclosure and appended claims.

What is claimed is:

1. A system for controlling an operation of feeding recording media from a plurality of physical medium containers of an output apparatus, the system comprising:
   at least one memory to store a first correlation between a plurality of different types of the recording media and a plurality of first identifiers representing virtual containers of the recording media, and to store a second correlation between the plurality of first identifiers and a plurality of second identifiers representing the plurality of physical medium containers of the recording media in the output apparatus, wherein at least one of the first identifiers correlates with multiples ones of the plurality of second identifiers; and
   circuitry configured to
      generate an output instruction including the at least one of the first identifiers representing a virtual container of a specific recording medium to be used in performing an image forming operation by the output apparatus;
      extract the at least one of the first identifiers from the output instruction;
      identify multiple ones of the plurality of physical medium containers each containing the specific recording medium to be used in performing the image forming operation by correlating the at least one of the first identifiers with the multiple ones of the plurality of physical medium container based on the second correlation; and
      generate a feed instruction for one of the multiples ones of the plurality of physical medium containers to feed the specific recording medium for the image forming operation.

2. The system of claim 1, wherein the circuitry updates the second correlation stored in the memory.

3. The system of claim 2, wherein the circuitry updates the second correlation based on information received from the output apparatus.

4. The system of claim 2, further comprising:
   a display to display the second correlation stored in the memory; and
   an operation unit to receive a user instruction for changing a display status of the second correlation stored in the memory and displayed on the display,
   wherein the operation unit changes the display status when an operation for changing the display status is performed, and the circuitry updates the second correlation stored in the memory based on the operation for changing the display status.

5. The system of claim 1, wherein the plurality of different types of the recording media includes physical property information of the recording media.

6. The system of claim 5, wherein the plurality of different types of the recording media includes at least any one of size, color, basis weight, and feed direction of the recording media.

7. The system of claim 1, wherein the plurality of different types of the recording media are containable in the respective physical medium containers.

8. The system of claim 1, wherein the circuitry detects that a first container among the multiples ones of the plurality of physical medium containers is associated with a feed error, and in response selects a second container among the multiples ones of the plurality of physical medium containers to feed the specific recording medium for the image forming operation.

9. A method of controlling an operation of feeding recording media from a plurality of physical medium containers of an output apparatus in a system, the method comprising:
   storing a first correlation between a plurality of different types of the recording media and a plurality of first identifiers representing virtual containers of the recording media;
   storing a second correlation between the plurality of first identifiers and a plurality of second identifiers representing the plurality of physical medium containers of the recording media in the output apparatus, wherein at least one of the first identifiers correlates with multiples ones of the plurality of second identifiers;
   generating an output instruction including the at least one of the first identifiers representing a virtual container of a specific recording medium to be used in performing an image forming operation by the output apparatus;
   extracting the at least one of the first identifiers from the output instruction;
   identifying multiple ones of the plurality of physical medium containers each containing the specific recording medium to be used in performing the image forming operation by correlating the at least one of the first identifiers with the multiple ones of the plurality of physical medium container based on the second correlation; and
   generating a feed instruction for one of the multiples ones of the plurality of physical medium containers to feed the specific recording medium for the image forming operation.

10. A non-transitory storage medium storing a program that, when executed by a computer, causes the computer to execute a method of controlling an operation of feeding recording media from a plurality of physical medium containers of an output apparatus in a system, the method comprising:
   storing a first correlation between a plurality of different types of the recording media and a plurality of first identifiers representing virtual containers of the recording media;
   storing a second correlation between the plurality of first identifiers and a plurality of second identifiers representing the plurality of physical medium containers of the recording media in the output apparatus, wherein at least one of the first identifiers correlates with multiples ones of the plurality of second identifiers;
   generating an output instruction including the at least one of the first identifiers representing a virtual container of a specific recording medium to be used in performing an image forming operation by the output apparatus;
   extracting the at least one of the first identifiers from the output instruction;
   identifying multiple ones of the plurality of physical medium containers each containing the specific recording medium to be used in performing the image forming operation by correlating the at least one of the first identifiers with the multiple ones of the plurality of physical medium container based on the second correlation; and
   generating a feed instruction for one of the multiples ones of the plurality of physical medium containers to feed the specific recording medium for the image forming operation.

* * * * *